United States Patent [19]

Ujhidy et al.

[11] 3,882,177
[45] May 6, 1975

[54] PROCESS FOR THE PREPARATION OF DL-THREO-1-(P-NITRO-PHENYL)-2-ACETAMINO-1,3-PROPANEDIOL

[75] Inventors: Aurél Ujhidy; László Szotyori; János Szépvölgyi, all of Veszprem; Károly Horváth, Budapest; Ferenc Nagy, Budapest; István Orbán, Budapest; István Simonyi, Budapest, all of Hungary

[73] Assignee: Egyt Gyogyszervegyeszeti Gyar, Budapest, Hungary

[22] Filed: May 7, 1973

[21] Appl. No.: 357,718

[30] Foreign Application Priority Data
May 12, 1972 Hungary............................ EE 2024

[52] U.S. Cl............................. 260/562 CL; 260/562
[51] Int. Cl............................................. C07c 97/16
[58] Field of Search............... 260/562, 570.6, 6.8 H

[56] References Cited
UNITED STATES PATENTS
2,515,239  7/1950  Long................................. 260/562

Primary Examiner—Harry I. Moatz
Attorney, Agent, or Firm—Young & Thompson

[57] ABSTRACT

In a process for the preparation of DL-threo-1-(p-nitrophenyl)-2-acetamino-1,3-propanediol from the isopropanol solution of DL-threo-1-(p-nitrophenyl)-2-acetamino-1,3-propanediol - aluminiumalcoholate compounds formed in the Meerwein-Ponndorf-Verley reduction of p-nitro-α-acetamino-β-hydroxy-propiophenon via aqueous or aqueous-mineral acidic hydrolysis, evaporation and removal of the aluminium salt, the improvement that prior to or simultaneously with the separation of isopropanol the aluminium alcoholates formed in the reduction are hydrolyzed in the presence of the calculated amount or less, but not lower than 50 % of water, water vapour or of an equivalent amount of aqueous mineral acid solution, isopropanol is distilled out continuously, the powdery mixture of DL-threo-1-(p-nitrophenyl)-2-acetamino-1,3-propanediol and aluminium oxide is treated to remove aluminium in the form of its double salt and optionally the hydrolysis is completed in this leaching step, and DL-threo-1-(p-nitrophenyl)-2-acetamino-1,3-propanediol is separated.

This improved process can be carried out continuously with high yields and under optimum conditions, also making possible an almost complete recovery of isopropanol.

4 Claims, No Drawings

PROCESS FOR THE PREPARATION OF DL-THREO-1-(P-NITRO-PHENYL)-2-ACETAMINO-1,3-PROPANEDIOL

This invention relates to a process for the preparation of DL-threo-1-(p-nitrophenyl)-2-acetamino-1,3-propanediol. More particularly, this invention relates to the continuous evaporation and simultaneous hydrolysis of the isopropanol solution obtained as the product of the Meerwein-Ponndorf-Verley reduction of p-nitro-α-a-cetamino-β-hydroxy-propiophenon (oxymethyl), to the drying of the substance, and to the separation of DL-threo-1-(p-nitrophenyl)-2-acetamino-1,3-propanediol (acetaminodiol), formed in the reduction, from the mixture. This latter compound is a valuable intermediate of the synthesis of chloroamphenicol, i.e. D-(−)-threo-2,2-dichloroacetamino-1-(p-nitrophenyl)-1,3-propanediol.

It is known that aluminium alcoholates, primarily aluminium isopropylate, are extensively used for the selective reduction of the oxo groups of oxo compounds containing other reducible groops, too. This method, i.e. the Meerwein-Ponndorf-Verley reduction, is also widespread in the industry. The main points in the up-to-date and economic large-scale realization of this method are the simple and quick separation of the hydroxy compound formed in the reaction, and the maximum yield, whereas the regeneration of isopropanol used as reaction medium and liberating from the metal alcoholate has also a significance.

According to the known processes (U.S. Pat. No. 2,687,434) the reaction mixture obtained in the Meerwein-Ponndorf-Verley reduction of p-nitro-α-acetamino-β-hydroxy-propiophenon is processed as follows:

the warm isopropanol solution of the complex of acetaminodiol formed with aluminium alcoholates (Meerwein complex) is decomposed with water, and the acetaminodiol formed in this hydrolysis step is isolated from the separated aluminium hydroxide by filtration and extraction. Using this method, a yield not higher than 70 % calculated for the oxymethyl compound can be reached.

The disadvantage of this process is that the filtration of the separated fluffy aluminium hydroxide is difficult and time-consuming, and the precipitate adsorbs a significant amount of acetaminodiol.

The reaction mixtures obtained in the Meerwein-Ponndorf-Verley reduction of ketones are processed generally by the following procedure: the isopropanol solution of the Meerwein complex is evaporated, and the aluminium alcoholates forming the solid residue are decomposed in an aqueous hydrochloric acid medium (Wilds: Organic Reactions, 2, 178 /1944/). If, however, the reaction mixture of the reduction of oxymethyl is processed by the above method, the amino group of the product undergoes a simultaneous deacetylation, and the deacetylated product separates in crystalline state as the corresponding hydrochloride salt. Aluminium remains in the aqueous solution in the form of aluminium chloride. Thus, acetaminodiol cannot be obtained by this method.

The above method has several other disadvantages. Due to the local overheating of the mixture, occurring even when the evaporation is carried out in vacuo, the product is damaged, and the isopropanol loss is also considerable.

The amount of recoverable isopropanol depends on the viscosity of the solution to a great extent, and the recovery is also influenced by the solubility of the solids present and by the isopropanol-retention capacities of the solids. In general, the viscosity of the solution increases rapidly after removing 50 % of the isopropanol, and the solid phase separates even under the intensive stirring of the mixture, which renders difficult the further removal of the alcohol. Namely, upon the evaporation of further amounts of alcohol the residue cannot be removed from the apparatus, thus, by this method an ill-defined concentrate of unknown chemical composition is passed to the further processing. Consequently, the amount of the mineral acid solution necessary for the further processing cannot be adjusted to the optimum value.

Simultaneously with the decomposition of the Meerwein-complex with aqueous hydrochloric acid the amino group undergoes a deacetylation, and the liberated amino compound forms a hydrochloride salt with the hydrochloric acid. This salt, however, is relatively soluble in water (much better than acetaminodiol), causing considerable losses at the crystallization. Due to the above facts the yield of DL-threo-1-(p-nitrophenyl)-2-amino-1,3-propanediol hydrochloride varies in a relatively broad range, and yields higher than 80 to 85 % cannot be reached. It is well known that rotating (film) evaporators can be used for the continuous evaporation of heat-sensitive materials even when the viscosity increases considerably during evaporation. For this reason we attempted the continuous evaporation of the isopropanol solution by means of rotating film evaporators. We have found, however, that the evaporator, having either a rigid or a swinging-blade rotor, could not be operated until the appearance of the solid residue, because a sticky, viscous mass deposited onto the blades and axis of the rotor with the decrease of the amount of isopropanol, filling the whole interior of the evaporator.

Now we have found, unexpectedly, that the isopropanol solution of the Meerwein-complex obtained in the reduction can be evaporated to dryness in a rotating film evaporator in a continuous way if before, after, or simultaneously with the introduction of the complex water, water vapour or an aqueous solution of a mineral acid is added to the solution to be evaporated. In this method the partial or complete hydrolysis of the Meerwein-complex takes place simultaneously with the evaporation, and also the isopropanol originally present as alcoholate can be regenerated.

In the method according to the invention 50 to 100 %, preferably 70 to 100 % of the water necessary for the hydrolysis of the Meerwein-complex is added to the isopropanol solution, and as a result of the evaporation combined with hydrolysis a mixture of DL-threo-1-(p-nitrophenyl)-2-acetamino-1,3-propanediol and aluminium oxide is removed continuously from the film evaporator. The aluminium compound formed during the hydrolysis prevents the gellification of the distillation residue, and also prevents the viscous material from sticking onto the rotor and to the walls of the evaporator. According to the invention the hydrolysis, evaporation and drying can be carried out simultaneously either in a vertical or a horizontal film evaporator.

The solid product obtained from the evaporator is a stoichiometric mixture of acetaminodiol and aluminium oxide (or, in the case of partial hydrolysis, a proportional amount of Meerwein-complex), thus this solid mixture of well-defined composition can easily be subjected to further processing, since the actual composition of the solid mixture can be determined accurately, and optimum parameters can be adjusted for the removal of the aluminium oxide present. Aluminium oxide is removed from the mixture of known stoichiometric composition in the form of a double salt (e.g. as a basic sodium-aluminium carbonate, $NaAl(OH)_2CO_3$), with an aqueous solution containing calculated amounts of an alkali metal hydroxide and alkali metal carbonate (preferably sodium or potassium hydroxide or carbonate), and the hardly water-soluble acetaminodiol residue is separated.

According to a particularly preferred method of the invention aluminium oxide is dissolved in an aqueous solution containing calculated amounts of an alkali metal sulfate (preferably potassium or sodium sulfate) and sulfuric acid, in the form of alkali metal aluminium sulfate, and the hardly water-soluble acetaminodiol is separated from the solution of pH 6. Using this method of the invention the product is not damaged, because it is separated from an almost neutral mixture.

The process of the invention has several advantages in comparison with the known processes. These advantages are summarized below.

The capacity of processing the Meerwein-complex increases to a great extent, because the evaporation of the isopropanol solution of the complex, and the decomposition and drying of the complex are carried out simultaneously, in a continuous way.

The use of water, water vapour or an aqueous mineral acid solution in an amount of 50 to 100 %, preferably 70 to 100 % of that required for the complete hydrolysis makes possible not only the continuous operation of the process, but also the regeneration of the isopropanol present originally in the form of alcoholate, besides the almost complete amount of the solvent. The thus-regenerated isopropanol contains not more than 0.5 % of water, hence it can be used directly for the preparation of aluminium isopropylate without a subsequent drying operation.

It is to be mentioned that the water content of the regenerated isopropanol can be controlled by the amount of water added to the mixture. Thus, for example, if it is essential to obtain nearly dry isopropanol in the process, less than 100 % of the calculated amount of water is added to the Meerwein-complex. In this instance the undecomposed complex behaves as a drying agent, and the presence of this small amount of Meerwein-complex is not disadvantageous in the subsequent processing, since the hydrolysis of this complex takes place very quickly and simultaneously with the removal of aluminium oxide.

When the water content of the regenerated isopropanol is not critical, the Meerwein-complex is decomposed quantitatively, i.e. the calculated amount of water is introduced into the isopropanol solution.

The essentially solvent-free solid powder mixture removed from the film evaporator contains stoichiometric amounts of acetaminodiol and aluminium oxide, optionally together with small amounts of the Meerwein-complex. This mixture has a well-defined composition, accordingly the amounts of reagents necessary for removing aluminium oxide can be calculated accurately. Consequently, optimum conditions can be maintained, and the residual acetaminodiol can be separated from a weak acidic (pH 4 to 5) or almost neutral solution without any decomposition. In comparison with the method described in Organic Reactions, 2, 178 (1944), it is not necessary to separate the reduced product in the form of aminodiol hydrochloride, thus both the further acetylation step and the yield losses arising from the increased solubility of the aminodiol salt can be avoided.

By the method of the invention both the free and the bonded isopropanol can be recovered to 80 to 90%, and acetaminodiol can be prepared with a yield exceeding 90 % (calculated for the oxymethyl compound), in comparison with the maximum yield of 80 to 85 % of the known process.

The process of the invention is elucidated in detail by the aid of the following non-limiting Examples.

EXAMPLE 1

Oxymethyl compound is added to an isopropanol solution of aluminium isopropylate prepared according to the usual method (starting from anhydrous isopropanol, aluminium, and carbon tetrachloride), and a part of the solvent is removed by distillation. The isopropanol solution of the product of Meerwein-Ponndorf-Verley reduction, containing 70 % of isopropanol solvent and 30 % of dry substance, is obtained. The dry substance contains 35 % of chemically bonded isopropanol.

The above solution is pumped into a film reactor of 0.12 m² active surface equipped with a swinging blade rotor, with a feed rate of 0.300 kg./min. The reactor is heated with water vapour overheated to 145°C.

Simultaneously with the isopropanol solution water is introduced, either at two different points of the evaporator, namely at the same height as the isopropanol solution inlet and at the half height of the film evaporator, each with 7.5 g./min. feed rate, or at one point, at the same reactor height of the isopropanol solution inlet with 15 g./min. feed rate.

The evaporated and partially dried material dropping onto the lower part of the film evaporator is removed by a pulley transport equipment heated to 100° to 120°C. The solvent vapours departing at the upper part of the film evaporator are collected in a condenser.

The powdery material leaving the reactor contains 4.02 % of adsorbed isopropanol and 7.10 % of isopropanol bonded in the form of alcoholate. The water content of the condensed solvent is 0.2 to 0.5 %.

According to this Example 14,000 kg. of isopropanol solution were introduced into the evaporator. 4,116 kg. of solid product and 9,653 kg. of solvent were obtained, thus the operation loss was 6.33 %. On the basis of the analytical data the solid material contained 4.04 % of the isopropanol originally present in physically or chemically bonded state. During the evaporation 86.38 % of the free and bonded disopropanol can be regenerated.

EXAMPLE 2

Oxymethyl compound is added to an isopropanol solution of aluminium isopropylate prepared according to the usual method (starting from anhydrous isopropanol, aluminium turnings, and carbon tetrachloride), and a part of the solvent is distilled off. The isopropanol solution of the Meerwein-Ponndorf-Verley reduction product is obtained, containing 72 % of isopropanol solvent and 28 % of dry substance. The dry substance contains 35 % of chemically bonded isopropanol.

The above solution is pumped into a film reactor of 0.12 m² active surface, equipped with a swinging-blade rotor, with a feed rate of 0.260 kg./min. The reactor is heated with water vapour overheated to 125°C.

Simultaneously with the isopropanol solution water is introduced, either at two different points of the evaporator, namely at the same height as the isopropanol solution inlet and at the half height of the film evaporator each with 6 g./min. feed rate, or at one point, at the same reactor height as the isopropanol solution inlet with 12 g./min. feed rate.

The evaporated and partially dried material dropping onto the lower part of the film evaporator is removed by a pulley transport equipment heated to 100° to 120°C. The solvent vapours departing at the upper part of the film evaporator are collected in a condenser.

The powdery material leaving the reactor contains 8.34 % of adsorbed isopropanol and 13.23 % of isopropanol bonded in the form of alcoholate. The water content of the condensed solvent is 0.3 to 0.5 %.

According to this Example 13,250 kg. of isopropanol solution were processed. 4,883 kg. of solid product and 8,298 kg. of solvent were obtained, thus the operation loss was 4.85 %. On the basis of the analytical data the solid material contained 9.70 % of the isopropanol originally present in physically or chemically bonded state. During the evaporation 76.25 % of the free and bonded isopropanol can be regenerated.

EXAMPLE 3

Oxymethyl compound is added to an isopropanol solution of aluminium isopropylate prepared according to the usual method (starting from anhydrous isopropanol, aluminium turnings, and carbon tetrachloride), and a part of the solvent is distilled off. The isopropanol solution of the Meerwein-Ponndorf-Verley reduction product is obtained, containing 70 % of isopropanol solvent and 30 % of dry substance. The dry substance contains 35 % of chemically bonded isopropanol.

The above solution is pumped into a film reactor of 0.12 m² active surface, equipped with a swinging-blade rotor, with a feed rate of 0.300 kg./min. The reactor is heated with water vapour overheated to 130°C.

Simultaneously with the isopropanol solution 30 % aqueous sulfuric acid solution is introduced into the reactor at the same reactor height with a feed rate of 21.4 g./min. The evaporated and partially dried material dropping onto the lower part of the film evaporator is removed by a pulley transport equipment heated to 100° to 120°C. The solvent vapours departing at the upper part of the film evaporator are collected in a condenser.

The powdery material leaving the reactor contains 6.38 % of adsorbed isopropanol and 6.93 % of isopropanol bonded in the form of alcoholate. The water content of the condensed solvent is 0.4 to 0.6 %.

According to this Example 14,000 kg. of isopropanol solution were processed. 3,785 kg. of solid product were obtained, and the operation loss of the evaporation was 5.97 %. On the basis of the analytical data the solid material contained 4.46 % of the originally present isopropanol in physically or chemically bonded state. During the evaporation 90.92 % of the free and bonded isopropanol can be regenerated.

EXAMPLE 4

Oxymethyl compound is added to an isopropanol solution of aluminium isopropylate prepared according to the usual method (starting from anhydrous isopropanol, aluminium turnings, and carbon tetrachloride), and a part of the solvent is distilled off. The isopropanol solution of the Meerwein-Ponndorf-Verley reduction product is obtained, containing 70 % of isopropanol solvent and 30 % of dry substance.

80 % of the stoichiometric amount of water required for the hydrolysis of the alcoholate corresponding to the amount of the introduced aluminium is added to the solution, and the obtained suspension is passed into a film reactor of 0.12 m² active surface, equipped with a swinging-blade rotor, with a feed rate of 0.25 kg./min. The reactor is heated with water vapour overheated to 145°C.

The evaporated material dropping onto the lower part of the film evaporator is removed through a lock chamber. The solvent vapours departing at the upper part of the film evaporator are collected in a condenser.

The powdery material leaving the reactor contains 3.29 % of adsorbed isopropanol and 4.78 % of isopropanol bonded in the form of alcoholate. The water content of the condensed solvent is 0.3 to 0.4 %.

According to this Example 14.25 kg. of isopropanol solution were treated. 4.38 kg. of solid substance and 9.23 kg. of solvent were obtained, thus the operation loss was 4.4 %. During the evaporation 92.3 % of the introduced isopropanol can be regenerated.

EXAMPLE 5

200 g. of oxymethyl compound are stirred for 1 hour at 60°C with the appropriate amount of the isopropanol solution of aluminium isopropylate.

70 ml. of 20°C water are added dropwise to the obtained red solution, and the formed suspension is evaporated in a laboratory-scale rotating evaporator. The powder obtained in this process is added to the vigorously stirred mixture of 1 l. of water, 550 ml. of 20 % sodium hydroxide and 53 g. of anhydrous sodium carbonate. The powder is quickly dissolved, thereafter D-L-threo-1-(p-nitrophenyl)-2-acetamino-1,3-propanediol separates. After stirring for half an hour the solids are filtered off on a G3 sintered glass filter, washed with 3×30 ml. of 2 % sodium hydroxide solution and with water, and dried. 184 g. of acetaminodiol are obtained (yield: 92 %, calculated for the amount of oxymethyl compound). M.p.: 164°–165°C.

EXAMPLE 6

200 g. of oxymethyl compound are added in small portions into the isopropanol solution containing the appropriate amount of aluminium isopropylate, and the obtained red solution is stirred at 60°C for 1 hour. Thereafter 70 g. of water are added to the mixture, and the formed suspension is evaporated in a laboratory-scale rotating evaporator.

The powder obtained in this process is added in small portions into the vigorously stirred mixture of 213 g. of anhydrous sodium sulfate (or an equivalent amount of sodium sulfate hydrate), 30.6 g. of 96 % sulfuric acid and 1500 ml. of water at 20°C. The formed suspension of pH≈4 is stirred for further 0.5 hours. The separated DL-threo-1-(p-nitrophenyl)-2-acetamino-1,3- propanediol is filtered off, washed with water, and dried at 60°C. 184 g. (92 %, calculated for the oxymethyl compound) of the aimed product are obtained, m.p.: 164°–165°C.

EXAMPLE 7

2.13 g. of anhydrous sodium sulfate (or an equivalent amount of sodium sulfate hydrate) are dissolved in 15.0 l. of water, and 3.06 kg. of 96 % sulfuric acid are added to the solution. The obtained solution is cooled to 20°C, thereafter 6.0 kg. of Meerwein-complex (aluminium content: 8.3 %) are added in small portions to the vigorously stirred solution. Care should be taken that the temperature does not rise above 30°C. After adding the last portion the almost neutral suspension is stirred for additional 0.5 hours, and is simultaneously cooled to 16° to 18°C. The separated DL-threo-1-(p-nitrophenyl)-2-acetamino-1,3-propanediol is filtered off, washed with water, and dried at 60°C.

1.95 kg. (91 %, calculated for the oxymethyl compound) of the aimed product are obtained; m.p.: 164°–165°C.

What we claim is:

1. A process for the preparation of DL-threo-1-(p-nitrophenyl)-2-acetamino-1,3-propanediol from the isopropanol solution of DL-threo-1-(p-nitrophenyl)-2-acetamino-1,3-propanediol - aluminium alcoholate compounds formed in the Meerwein-Ponndorf-Verley reduction of p-nitro-α-acetamino-β-hydroxy-propiophenone, comprising hydrolyzing said aluminum alcoholates in the presence of 50–100% of the calculated amount of water, water vapor or an equivalent amount of aqueous mineral acid solution, simultaneously with or subsequent to said hydrolysis evaporating isopropanol continuously, then dissolving aluminum oxide in the form of its doulbe salt from the residual powdery mixture of DL-threo-1-(p-nitrophenyl)-2-acetamino-1,3-propanediol is a solvent system selected from the group consisting of an aqueous solution of alkali metal sulfate and sulfuric acid at a pH of about 6 and a temperature no higher than 30°C. and an aqueous solution of alkali metal hydroxide and alkali metal carbonate, and then separating said DL-threo-1-(p-nitrophenyl)-2-acetamino-1,3-propanediol from the reaction mixture.

2. A process as claimed in claim 1, in which the isopropanol solution of aluminium alcoholate formed in the Meerwein-Ponndorf-Verley reduction is evaporated in a vertical or horizontal film evaporator.

3. A process as claimed in claim 2, in which said calculated amount is added to the isopropanol solution of the alcoholate prior to or simultaneously with the introduction of the latter into the film evaporator.

4. A process as claimed in claim 1, in which said alkali metal is sodium or potassium.

* * * * *